United States Patent [19]

Baker et al.

[11] Patent Number: 4,964,737
[45] Date of Patent: Oct. 23, 1990

[54] REMOVABLE THERMOCOUPLE TEMPLATE FOR MONITORING TEMPERATURE OF MULTICHIP MODULES

[75] Inventors: Don L. Baker, Johnson City; Glenn D. Gilda, Endicott; Terrence A. Quinn, Poughkeepsie; Hussain Shaukatullah, Endwell, all of N.Y.

[73] Assignee: IBM, Armonk, N.Y.

[21] Appl. No.: 324,929

[22] Filed: Mar. 17, 1989

[51] Int. Cl.$^5$ .............................................. G01K 7/02
[52] U.S. Cl. .................................... 374/179; 374/208; 324/158 R
[58] Field of Search ................ 374/57, 137, 179, 208, 374/210; 324/73 PC, 158 R

[56] References Cited

U.S. PATENT DOCUMENTS

| | | | |
|---|---|---|---|
| 4,466,746 | 8/1984 | Hancock et al. | 374/5 |
| 4,696,578 | 9/1987 | Mansuria et al. | 374/45 |
| 4,779,043 | 10/1988 | Williamson, Jr. | 324/73 R |

OTHER PUBLICATIONS

*Review of Scientific Instruments*, vol. 20, No. 9, Sep. 1949, "Surface Temperature Measuring Devices", Alice M. Stoll et al., pp. 679–680.

Primary Examiner—William A. Cuchlinski, Jr.
Assistant Examiner—W. Morris Worth

[57] ABSTRACT

A portable thermocouple template is built to have one or more separate thermocouple beads fixedly attached at predetermined locations on a thin insulator sheet, with appropriate tape or the like for holding each thermocouple and its pair of connector wires in position on the sheet. The template is mountable between interconnected electronic components, such as on the pin side of a multichip module, in order to monitor the temperature of the adjacent components under actual operating conditions. After the test is completed and the temperature data is recorded and/or displayed on a data logger, the template and related assembly wires are removed and stored until such time as the template is needed for mounting again in order for additional thermal tests to be conducted.

21 Claims, 6 Drawing Sheets

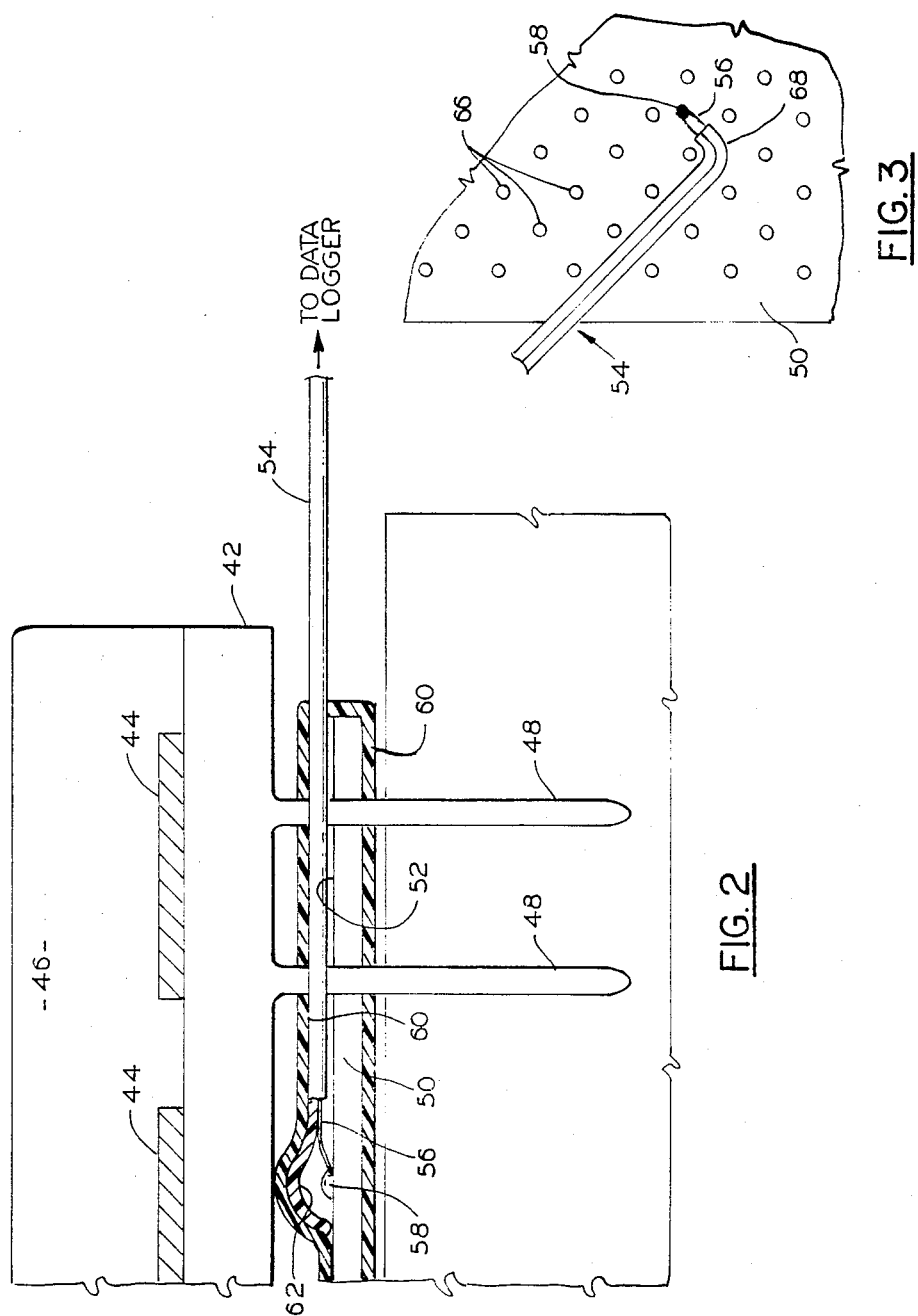

REMOVABLE THERMOCOUPLE TEMPLATE FOR MONITORING TEMPERATURE OF MULTICHIP MODULES

This invention relates generally to thermal testing of integrated circuits, and more specifically to techniques for mounting a thermocouple on multichip modules for measuring temperature during active operation of the chips.

BACKGROUND OF THE INVENTION

The use of thermocouples permanently mounted on-chip substrates to monitor temperatures during the chip-manufacturing process is well known. Also, permanently affixed thermocouples have been employed to measure the temperature of chips during their actual operation in a completed computer system.

Where permanently mounted thermocouples are undesirable or unnecessary, a crude form of manual installation of a thermocouple has previously been employed on the back of multichip modules used in earlier computers. Such a thermocouple was temporarily installed for conducting tests to measure module operating temperatures under various system conditions. The thermocouple was attached directly to the module substrate using epoxy. Each installation required careful tedious manual labor and the use of a microscope to install the thermocouple. Extreme care was required to avoid damaging the module, both in the installation procedure as well as in the removal procedure after the test was completed. Many problems were encountered due to factors such as human error in properly mounting and locating the thermocouple. Also, there was often a problem of incomplete epoxy adherence to hold the thermocouple securely in place. Each different location in the substrate which was thermally tested often required a completely new assembly and always required a customized manual installation. In other words, once a test was completed and the thermocouple removed, the thermocouple was not reusable in a subsequent test without having to go through another tedious customized installation. In some instances the removal procedure would even cause irreparable damage to the thermocouple.

As more and more integrated circuits are packed together on single and multilayered modules and boards, the collective generation of heat becomes a serious problem. It is now common to provide either an air cooled or liquid cooled heat sink on top of a multichip module, and to provide multiple pins extending from the bottom for plugging into multilayered circuit boards. A typical multichip module is the water cooled thermal conduction module (TCM) described in the article entitled "Thermal Conduction Module: A High-Performance Multilayer Ceramic Package", IBM J. Res. Develop., Vol. 26, No. 1, January 1982, pp. 30–36. A typical multilayered circuit board comprising a 20-layer composite is described in an article entitled "A New Set of Printed-Circuit Technologies for the IBM 3081 Processor Unit", IBM J. Res. Develop., Vol. 26, No. 1, January 1982, pp. 44. In a typical present computer system, a single TCM can contain as many as 1800 pins, and nine of the TCMs can be mounted on a single multilayered circuit board. It is not unusual for a single module to dissipate several hundred watts of power, and future power consumption is expected to be significantly increased for large individual modules.

In earlier times, when a component overheated and was damaged, it was economical to merely replace it with another component. However, multichip modules and multilayered circuit boards have become too expensive for frequent replacement. This creates the need to provide more reliable modules and circuit boards, and such reliability can only be assured by keeping their operating temperatures below acceptable maximums. Therefore it becomes very important to conduct thermal tests of the prototypes during actual operation (i.e., when the module is plugged into the board) to determine their expected operating temperatures, before embarking on production. Additionally, it becomes very important to test the first production units for excessive temperature during actual operation before shipping the computer system to customers. In that regard, it is the breakdown of pin lubricating oil at high temperatures that is one of the dangers to be avoided by assuring that the modules do not overheat during operation. Such oil breakdown can permanently damage the modules so as to be inoperable. Finally, it may become desirable to be able to test units which are in the field to locate excessive heating problems. Any time a change is made to any part of a computer system, such change may have an adverse effect on some other part of the system. The ability to make spot checks during actual operation in order to monitor temperature is becoming more of a necessity than merely a desirable option.

There is also a technique which has been developed in order to predict the operational life of computer components, called dynamic burn-in. In such a technique, the computer system is deliberately stressed beyond its normal operating limits for the purpose of accelerating early-life defects. Such a dynamic burn-in will necessarily cause the circuits to heat beyond normal specifications, and it is very desirable to have a thermocouple unit monitor the temperature of critical locations on a module or board to be sure the temperature does not exceed acceptable tolerances during the testing procedure.

OBJECTS AND BRIEF SUMMARY OF THE INVENTION

A primary object of the invention is to eliminate much of the repeated manual labor in thermal testing of multichip modules by providing a thermocouple template which is reusable.

Another primary object is to provide a thermocouple template which carries multiple thermocouples for simultaneously testing various locations on the same module and/or board for the purpose of determining chip module temperatures or board temperatures, and also the temperature gradients between such different locations.

A further important object is to form the template of a thin non-conductive material to avoid interfering with the mounting and operation of the module and/or board during the testing operation.

An additional object is to design the template for mounting on the pin side of the module by putting holes in the template in a pattern which matches the pattern of the module pin topology on the substrate.

Yet another object is to use very thin tape for holding the thermocouple in place on the template and for protecting the template from the pin lubricants and for preventing the non-conducting material from disintegrating due to repeated use and handling.

The invention includes a unique method of making the thermocouple template including the steps of drilling holes in an insulating sheet using the pre-determined pin pattern of the module; cutting out a piece of the insulating sheet to a certain size; marking the position on the piece where the thermocouple bead(s) will be located; fabricating the thermocouple from two wires including welding the bead at one end of the wires and installing at the other end of the wires a connector plug of the type insertable into a data logging unit; placing each thermocouple in their proper position on the drilled sheet; applying a thin layer of tape to hold the thermocouple against one side of the drilled sheet; and piercing holes in the tape to correspond with the holes in the drilled sheet.

The completed thermocouple template is easily installed or removed from a module by sliding it over the module pins which allows for repeated use of the template on several modules without additional use of specialized equipment or labor. The shape and thickness of the template allow the module/template composite to be installed on a board without damaging the module and without interfering with the normal operation of the chip circuits or the board circuits because of electronic noise, distortion and the like. Moreover, by using the thermocouple template, it is possible to obtain a direct temperature measurement in some critical areas, and a temperature of sites which are closely proximate to other critical areas, both of which are more accurate alternatives than attempting to predict a maximum temperature based on the thermal behavior of very remote but more easily accessible sections of the component.

In addition, up to four thermocouples have been installed on a single template in order to simultaneously monitor the thermal changes on the surface of a single module. Of course it is possible to install more if needed, all within the spirit of the invention. Accordingly, in the preferred embodiment, at least one edge of the template includes an enlarged border displaced from the module pins so that one of the thermocouples can be installed on such border to provide a base temperature for comparison with the temperatures detected by the other thermocouples. It was also found preferable to wrap the thin layer of tape on both surfaces of the sheet for additional strength and better sealing and better protection of the insulating sheet, and to extend the useful life of the template.

BRIEF DESCRIPTION OF DRAWINGS

FIG. 2 is a simplified schematic drawing showing a sectional view of a single terminal thermocouple template mounted under a module which is plugged into a multilayer board;

FIG. 3 is a fragmentary closeup view showing how a single terminal thermocouple is positioned between the pin holes on the insulated sheet of material;

DETAILED DESCRIPTION OF PREFERRED AND ALTERNATE EMBODIMENTS

Figure 1:
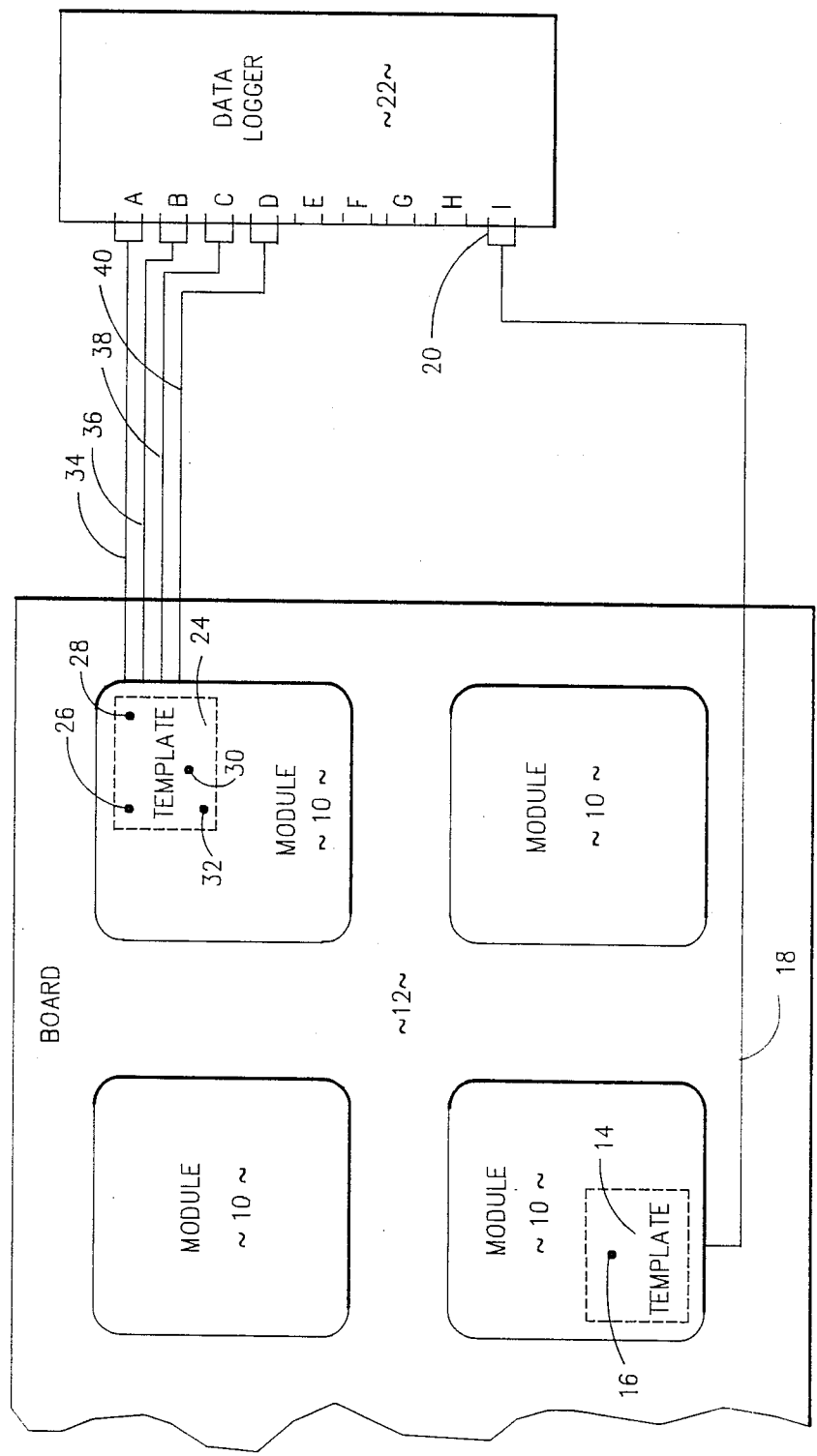
FIG. 1 is a block diagram showing a single terminal thermocouple embodiment and a four terminal thermocouple embodiment mounted on the pin side of two separate multichip modules.

Generally speaking the invention contemplates the use of a thermocouple template which is custom designed for repeated testing of the thermal characteristics of a multichip module having a predetermined pin pattern. Typically the pins are designated for different functions such as signals, specified positive and/or negative voltages, electrical grounding, and the like. The beads for each thermocouple are precisely located on a template between the pins so as to be adjacent to the critical pins when the template is mounted on the pin side of the module. For example, it is often desirable to have at least one of the thermocouple beads located directly under the center of one of the chips.

When it is considered necessary to conduct a temperature monitoring test, the thermocouple template is pushed onto the pin side of the module before plugging the module into its matching holes on a printed circuit board. Various operations are then performed on the computer system or portions thereof while dynamically recording the temperature changes on a data logger which is connected to the two wires of the thermocouple. Such operations can be diagnostic routines and normal instruction processing, which can also include specialized testing operations such as dynamic burn-in.

After completing the test, the module is unplugged and the thermocouple template removed from the pins and reused again on a different module or reused again at a later time on the same module. In order to facilitate such reusability, a thin layer of tape on both sides of the template serves to hold the thermocouple wires and bead in proper position, while at the same time protecting the insulating sheet from disintegration because of repeated use and handling as well as preventing absorption of the lubricating oil from the surface of the pins.

In the preferred form, the template covers only one of the quadrants of the module, since monitoring the temperature of one-quarter of the substrate is usually sufficient. For example, by considering the chip pattern in the module and/or the placement of the module on the board, it is often possible to tell which of the quadrants is most likely to have the highest operating temperature, and therefore that is the quadrant on which the template is mounted. It is important, among other things, to be sure that the temperature does not reach the breakdown point for the pin lubricant. If that occurs, some lubricants turn into a varnish-like substance which opens up the pin contact with its matching component thereby causing loss of conductivity. Larger or smaller thermocouple assemblies can be used if needed to cover less than a quadrant or else the entire substrate, all within the spirit of the invention.

While a certain precision is required in the assembly of a thermocouple template of the present invention, it is a relatively simple matter to mount the thermocouple template before testing and an equally simple matter to remove the thermocouple template after testing. The risks of physically damaging the module or its pins during such mounting and removal is virtually eliminated. Moreover, consistency of test results is increased since the thermocouples can be remounted in the very same location for each and every test. Thus, a set of norms can be established for any particular computer system, and subsequent testing in the research lab, or on the production line, or in the field can be considered very reliable without the need for highly skilled persons to administer the test. The size of the thermocouple template unit is small and compact making storage between tests very easy. Finally, the cost of materials is negligible and the time spent to assemble them into a finished thermocouple template is short compared to the time and expense required to manufacture and install replacement modules and/or replacement boards damaged due to overheating.

Referring now to FIG. 1, a number of multichip modules 10 are typically pluggable into a board such as a laminated printed circuit board 12. A single terminal thermocouple template 14 is mountable on the pin side of a module 10 with a single monitoring site 16 to which is connected a conventional two-wire thermocouple 18 having at its loose end a conventional connector 20. A conventional data logger such as a multi-input unit 22 transforms the changes in voltage across the thermocouple into temperature changes which are then recorded for immediate checking as well as future analysis. Also shown is a four terminal thermocouple template 24 mountable on the pin side of a module 10 with four separate monitoring sites 26, 28, 30, 32 respectively connected through two-wire thermocouples 34, 36, 38, 40 to connectors 20. Thus, test data can be simultaneously obtained from identically located sites on different modules, and/or from differently located sites on the same module.

Although various type of thermocouples can be employed with the present invention, suitable results were obtained by using a data logger for recording ANSI type T (Copper-Constantan) thermocouples with miniature connectors (Omega type NMP or equivalent). Also, it was found helpful to use a straight microprobe tool for enlarging holes in the thermocouple assembly and for removing the template from the substrate. Flat tipped tweezers were also found to be helpful in the removal step.

The relative dimensions in FIG. 2 are exaggerated in order to show the various components of a thermocouple template actually mounted on the pin side of a multichip module during a testing operation. A substrate 42 is used for carrying multiple chips 44, with some form of cooling unit such as 46 often located on top of the module immediately adjacent the chips. On the bottom of the module are numerous pins represented by 48 which pass through an insulated sheet 50 and two layers of tape 60 down into the board. On the top surface 52 of the insulated sheet 50 is a double wire thermocouple 54 which has its end wires 56 stripped of insulation in order to be joined together through a welded bead 58. A thin layer of tape 60 covers the top surface 52 and holds the double wire thermocouple as well as its welded bead securely in position. In the preferred form, the tape also covers the bottom surface of the insulated sheet 50. Through experimentation it was found desirable to cover the bead 58 and stripped wire ends 56 with a layer of epoxy 62 to provide electrical insulation from the pins as well as additional attachment to the sheet. After the layer of epoxy is applied, a resistance meter is used to check the sufficiency of the insulating qualities of the epoxy layer. It will be appreciated by those skilled in the art that there are various types of multichip modules having various densities and patterns of pins of differing lengths which are pluggable into spring loaded or friction fit receptacles housed in all kinds of circuit boards, and the illustration of FIG. 2 is merely a schematic representation for purposes of illustration only.

A closeup view in FIG. 3 shows how a two wire thermocouple is positioned between holes 66 on the insulated sheet. These holes are drilled in a pattern which is identical to the pattern of the pins of the multichip module. By providing a bend 68 immediately before the welded bead connecting the two wires, it is possible to precisely locate the monitoring site of the bead as well as provide stable mounting on the sheet 50. The exploded view of FIG. 4 clearly shows an alternate structure for a thermocouple template having four thermocouple 70. In this version, a perforated sheet 72 is sandwiched between a top tape layer 74 and a separate bottom tape layer 76. An assembly ID 78 is permanently marked on one corner to indicate which module and which testing site locations are associated with this template. A handle 79 is provided to facilitate the mounting and removal of the template relative to the pins of the module, and a tape extension 80 is provided to cover the handle. Widened edges 82, 84 on the outer perimeter of the sheet 50 have no perforations and therefore provide a neutral site for measuring temperature as well as add strength and stability to the template.

Figure 4:
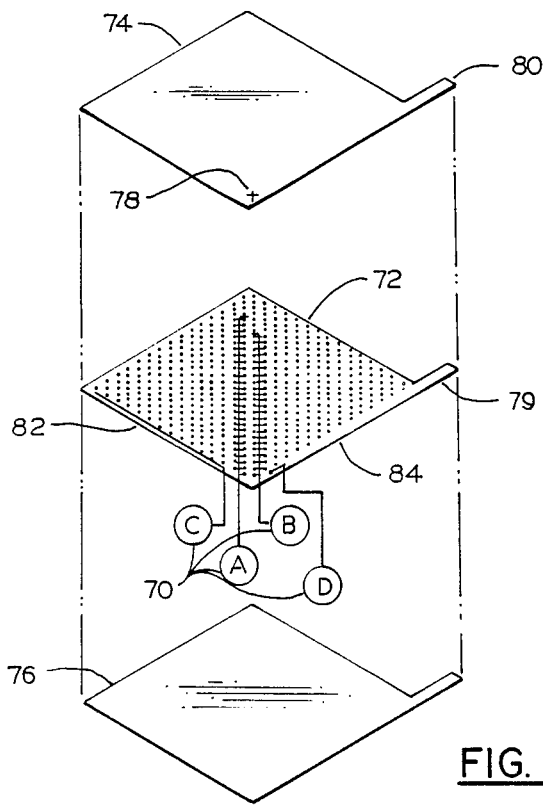
FIG. 4 is an exploded view of a four terminal thermocouple template.
Figure 5:
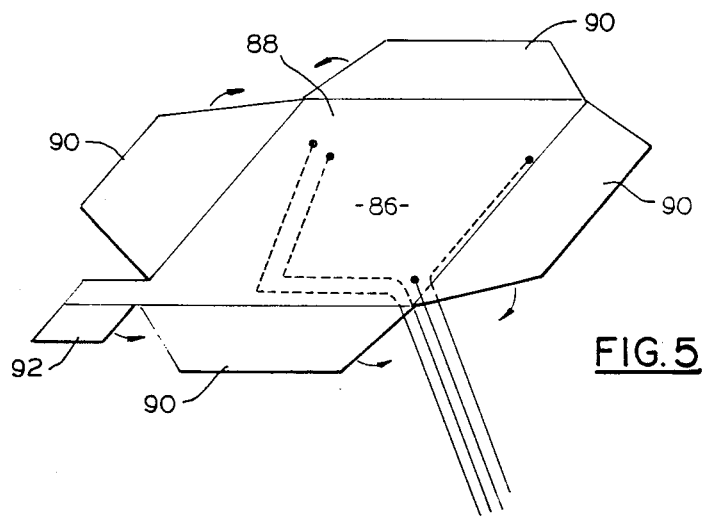
FIG. 5 illustrates the presently preferred manner of wrapping a thin layer of tape on both sides of the insulated sheet without any overlapping on a four terminal thermocouple template.

In contrast to the separate tape coverings of FIG. 4, the preferred structure has the thermocouples mounted on the top surface 86 of the sheet (See FIG. 5) and held there by a continuous central portion 88 of tape which has tapered flaps 90 extending outwardly in all four directions. The flaps are intended to be folded downwardly in the direction of the arrows in order to cover the bottom surface (not shown) of the sheet, and an additional flap 92 is provided for folding down to cover the bottom of the handle. It is highly desirable to keep the overall thickness of the thermocouple template small, typically less than one mm throughout its entire area. Accordingly, the shape of the flaps is designed to prevent tape overlap and to seal the edges of the sheet while still leaving an access passage at the corner for the thermocouple wires. Conformity to these thickness specifications is also assured by using insulating paper of 0.3 mm thickness and transparent tape #681 made by the 3M Company of approximately 0.1 mm thickness. Epoxy used to insulate the bead and bare wire ends was ScotchWeld brand epoxy. Additionally the thermocouple wires are not allowed to overlap each other on the insulator sheet. Finally, care must be taken in welding the bead to avoid creating too thick a bead.

Figure 6:
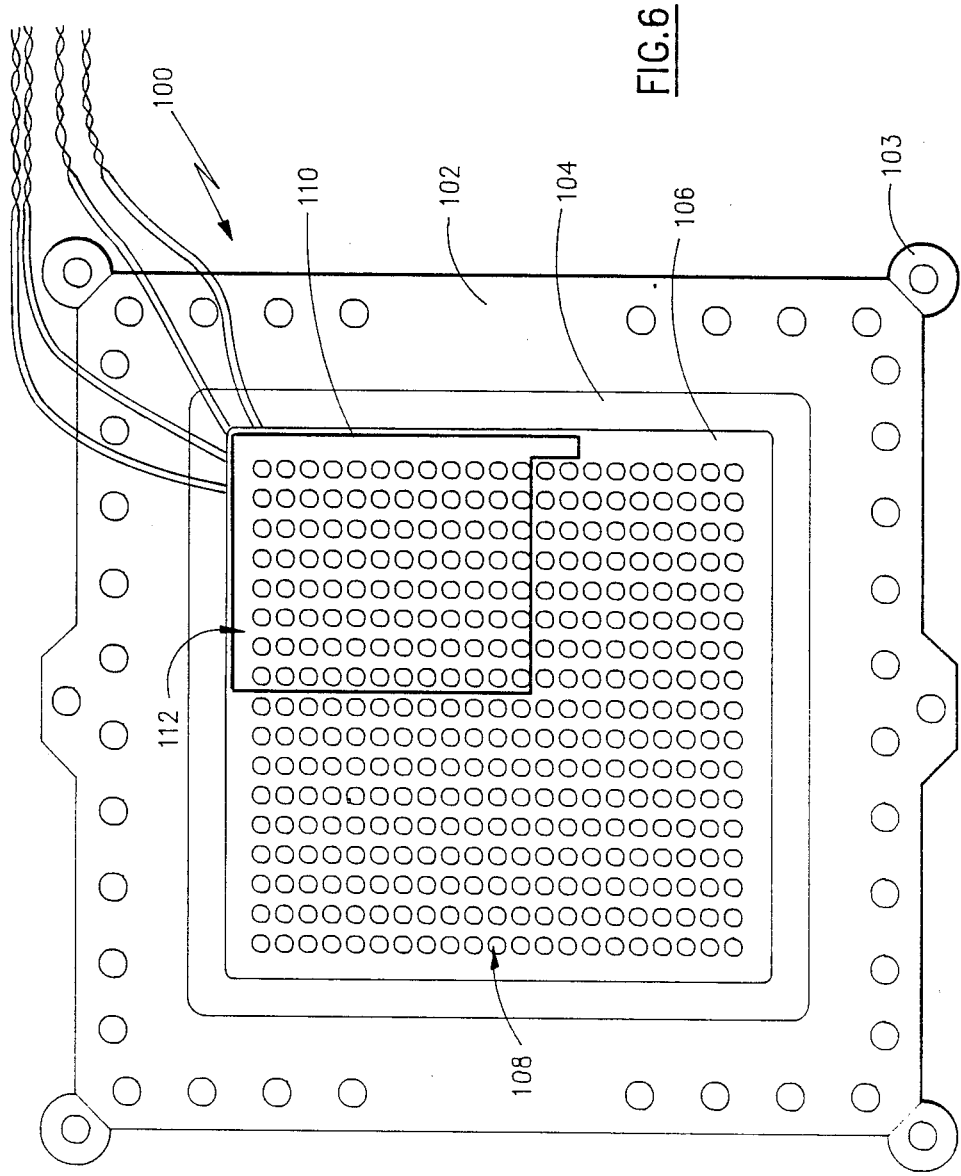
FIG. 6 is a bottom view of a four terminal thermocouple template mounted on the pin side of a TCM unit.

FIG. 6 shows the underside of a TCM unit 100 having the usual components such as a base plate 102, corner brackets 103, interior flange 104, and substrate 106. The number of pins 108 is not actually shown in the drawing. The drawing does show how a four terminal thermocouple template 110 appears mounted thereon with the pins 112 passing completely through the template. All of the pins in the quadrant covered by the template are in the potential monitoring area for any of the four thermocouples.

Figure 7:
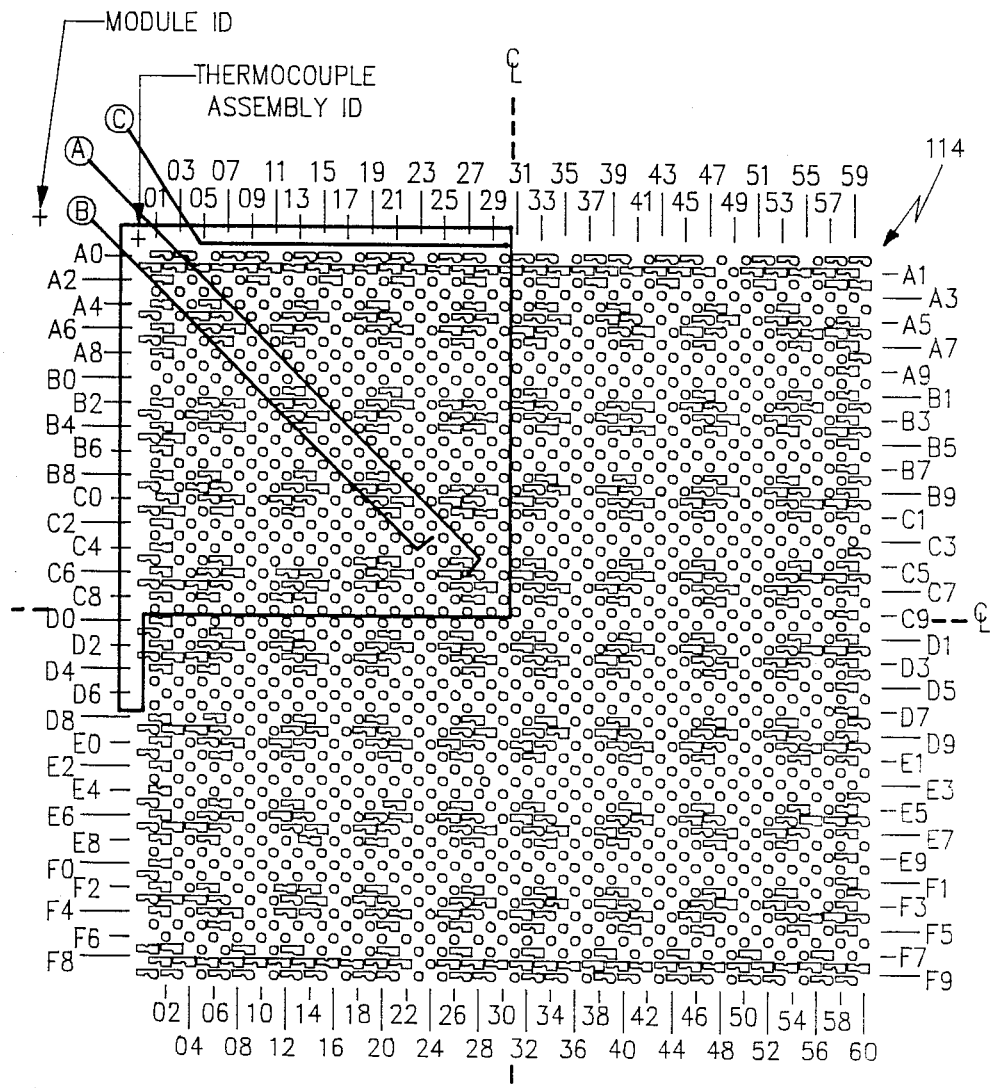
FIG. 7 is a bottom view of the pin pattern of a multichip module having 1800 pins, and showing a set of typical locations for the beads of three thermocouples on an insulated sheet designed for mounting on one quadrant of the multichip module.

FIG. 7 does show the actual pattern of pins on a multichip module 114 having 1800 pins in a pattern. Also shown is the manner of precisely locating each of the three thermocouples A, B. and C. In other words, the thermocouple bead is to be located immediately adjacent the pin or pins which are identified by their coordinates shown at the bottom of the drawing. Of course, the invention is not limited to the specific pin pattern shown or to the number or location of testing sites shown, but the illustrated embodiment of the invention shown in FIG. 7 serves to indicate the incredible number of pin positions found on multichip modules while at the same time showing the capability of the invention to monitor sites immediately adjacent to each and every one of those pins in the particular area covered by the template.

Figure 8:
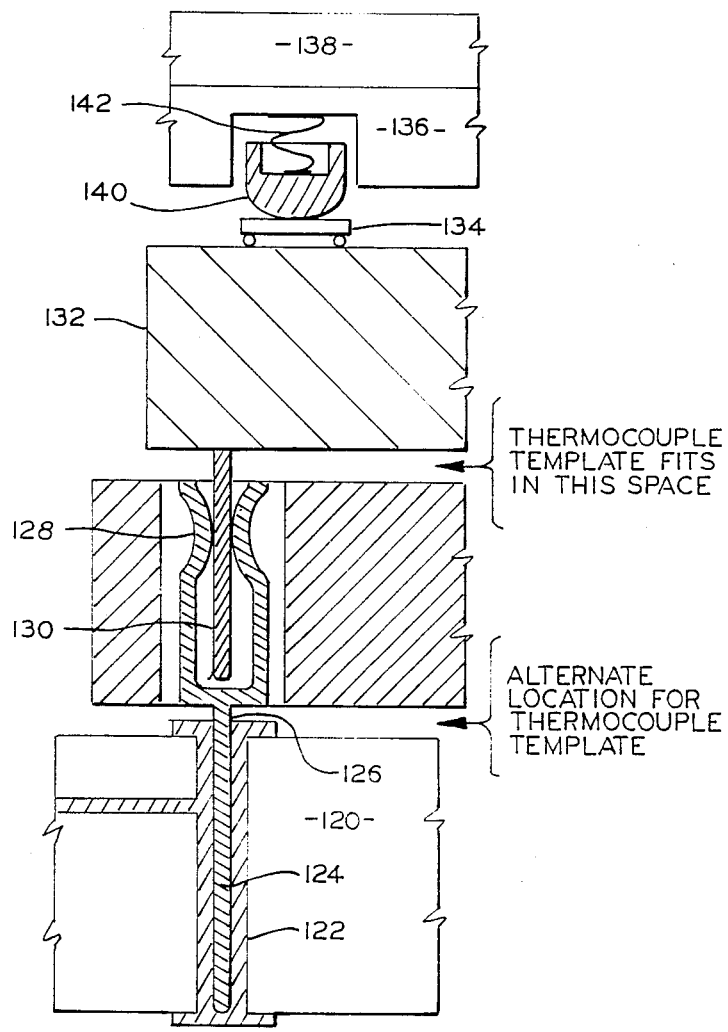
FIG. 8 is an enlarged schematic drawing showing an appropriate mounting space for a thermocouple template between two exemplary electronic components.

The schematic drawing of FIG. 8 shows how a thermocouple template can be positioned for thermally monitoring electronic components while they are interconnected. More specifically, a multilayered board 120 has a conductive sleeve 122 for receiving a lower end 124 of a contact spring 126. The contact spring has a bifurcated upper end 128 which is aligned to engage one of many pins 130 extending from the pin side of a TCM type of multichip module. The features of a TCM are well known in the art, including substrate 132, chip 134, hat 136, cold plate 138, and piston 140 which is held against the exposed face of the chip by a spring 142. It is apparent that the overall thickness of the thermocouple template is sufficiently thin so as to fit between the two interconnected components without interfering with their normal operation, thereby allowing easy testing of various predetermined sites simultaneously or sequentially to measure their respective temperatures. It will be seen that the exposed face of the chip is inaccessible to direct temperature monitoring, but the unique shape and construction of the thermocouple template nevertheless still allows the proximity of the testing site to be close enough to the chip and other pertinent areas to provide satisfactory testing.

It is to be understood that the length of the thermocouple wires between the template and the data logger can be extended in order to reach modules located almost anywhere. In this regard, wire lengths of 16 feet have been successfully used. The type of wire preferably used is 36 gauge having a diameter of 0.13 mm (0.005 inches). Finer wire can also be used.

As a result of experimentation, a presently preferred sequence of assembly steps has been developed as follows. First a drawing is prepared much like FIG. 7 to show the size and layout of the thermocouple template for a specified multichip module. Using that drawing, holes are drilled in the insulator sheet to match the pin pattern of the module, a piece is cut out of the sheet, and the piece is marked to show the position(s) where the thermocouple bead will be located. The required lengths of the thermocouple wires are cut to size, and the bead connecting the two wires together is formed by soldering and/or welding. In forming the bead, the two exposed ends of the wires can be wound together before welding or can be positioned a short distance apart and then joined through a bead formed by conventional arc welding. Although in some instances the bead will have a diameter approximately the same as the diameter of the wire, it is still acceptable to have an enlarged diameter bead so long as the bead diameter is less than three times the diameter of the wire.

The connector plug is now attached at the other end of the two wires. At this stage the thermocouples are checked for proper operation. If the test is satisfactory, the bead and exposed wire near the bead are coated with a thin coat of epoxy which is allowed to dry. The thin coat of epoxy is then tested to assure that it provides complete electrical insulation of the bead and exposed wires. In making the thermocouple bead, it is desirable to minimize the length of exposed wire welded to form the bead. As a further precaution, the wire adjacent to the connector is doubled over so that it lays on the surface of the connector plug, and such doubled over portion is taped to the connector for strain relief. This prevents the fragile wires from breaking loose inside the connector during handling.

Next the thermocouple is placed on the drilled cutout piece of insulator sheet so that its location and orientation matches with the drawing, and it is temporarily held in place with small strips of tape. In earlier experimental versions, small beads of epoxy were used instead of the tape strips. By this point it is important to have marked the thermocouple connectors with identification numbers such that they can be correctly identified later. Where multiple terminal thermocouples are involved, they are successively mounted in their appropriate places on the insulator piece. A portion of tape is now cut to be a size large enough to cover the thermocouple(s) as well as the entire surface on which they are mounted, with enough left over to fold over the edges to the other side (See FIG. 5). Lay this piece of tape flat on a clean work surface with the adhesive side facing up, and place the thermocouple/insulator piece composite on the adhesive tape with the thermocouples facing the tape. Avoid wrinkling the tape while pressing the composite in position by applying uniform pressure against the composite so that it sticks to the tape. The wires of the thermocouple should not be allowed to cross over each other on the insulator piece, since the completed thermocouple template must have a minimum thickness throughout. Cut out the excess adhesive tape around the corners such that when it is folded over to the other surface of the insulator cardboard piece, there are no tape overlaps. Fold the tape over to the other surface and thoroughly press the tape so that it is securely adhered on both surfaces of the insulator cardboard piece to seal the cardboard while at the same time holding the thermocouples in position. Where necessary, additional pieces of adhesive tape may be applied to cover over any exposed areas on the back side of the insulator piece, avoiding overlap and wrinkles.

Place the assembled template on a soft flat surface such as balsa wood, with the thermocouples facing up. Take a dental pick having a straight pointed end and use it to pierce holes in both layers of adhesive tape corresponding to the holes previously drilled in the insulator sheet. After piercing all of the holes, try the assembly out on a module, enlarging the holes as needed to assure easy mounting and dismounting of the thermocouple template on the pin side of the multichip module. All the thermocouple wires for each assembly can now be braided together starting from near the assembly and proceeding toward the connector end. This prevents the individual wires from becoming tangled together or tangled with wires from other assemblies. All of the wires of the completed assembly can now be suitably wrapped and held such as by a small piece of tie-wrap, so that the completed testing template unit can be stored in an appropriate clean box when it is not in use. It will be appreciated that the foregoing assembly steps require no specialized tools and no expensive materials, and the completed thermocouple templates can be reused over and over again in order to provide accurate and reliable test data for multichip modules and adjacent components which data is dynamically acquired during actual operating conditions.

While specific embodiments of the invention have been shown and described, it will be appreciated by those skilled in the art that various changes can be made and various revisions can be adopted, all within the spirit and scope of the invention as set forth in the following claims.

We claim:

1. A testing unit for monitoring the operating temperatures of electronic components including:

a flat sheet of insulator material adapted for mounting between an electronic component such as a multichip module and an adjacent component, with said multichip module having a plurality of pins extending from one side of the module and wherein said flat sheet includes a plurality of apertures matching the pattern of said pins for removable mounting of said flat sheet over said pins on the pin side of the module, said flat sheet being sized to be mounted over only a portion of said pins;

at least one thermocouple positioned at a predetermined location on a surface of said flat sheet;

wire means electrically connected to said thermocouple for carrying data to a display and/or recording device; and attachment means connected to said thermocouple and said flat sheet for holding said thermocouple in its predetermined location.

2. The testing unit of claim 1 wherein said flat sheet is sized to be mounted over one quadrant of said pins on said multichip module.

3. The testing unit of claim 1 wherein said attachment means includes tape means overlying said thermocouple and also overlying the adjacent portion of said flat sheet.

4. The testing unit of claim 3 wherein said tape means includes a layer of tape completely overlying the surface of said flat sheet on which is located said thermocouple.

5. The testing unit of claim 3 wherein said tape means includes a layer of tape overlying the surface of said flat sheet on which is located said thermocouple, said layer of tape also folding over to cover a portion of the opposite surface of said flat sheet.

6. The testing unit of claim 3 wherein said tape means is impervious to oil-like substances to prevent said flat sheet from absorbing lubricant from said pins of said multichip module and to prevent said flat sheet from disintegrating from repeated use and handling.

7. A testing unit for monitoring the operating temperatures of electronic components including:

a flat sheet of insulator material adapted for mounting between an electronic component such as a multichip module and an adjacent component, with said multichip module having a plurality of pins extending from one side of the module and wherein said flat sheet includes a plurality of apertures matching the pattern of said pins for removable mounting of said flat sheet over said pins on the pin side of the module, said flat sheet having at least one border portion having no apertures therein;

at least one thermocouple positioned at a predetermined location on a surface of said flat sheet, and a second thermocouple located on said border portion;

wire means electrically connected to said thermocouples for carrying data to a display and/or recording device; and attachment means connected to said thermocouples and said flat sheet for holding said thermocouples in respective locations.

8. The testing unit of claim 4 wherein the combined thickness of said flat sheet and said thermocouple and said attachment means is sufficiently thin so as to not interfere with the normal operation of the electronic components when placed therebetween.

9. The testing unit of claim 4 wherein said thermocouple includes a thermocouple bead connected to a pair of non-overlapping wires, with said bead and said wires on the same surface of said flat sheet.

10. The testing unit of claim 1 which further includes multiple thermocouples on said flat sheet.

11. The testing unit of claim 7 which includes four thermocouples on said flat sheet.

12. The testing unit of claim 10 wherein all of said multiple thermocouples are mounted on the same surface of said thin sheet.

13. A testing unit for dynamically monitoring temperature changes on at least two sites located on the same multichip module during actual operation of the module, including:

an insulator sheet sandwiched between two layers of sealing tape;

multiple pins extending from the multichip module;

a series of apertures extending through said sheet and said two layers of sealing tape which apertures are in a pattern corresponding to the pattern of said pins;

at least two thermocouples attached to different predetermined locations on said sheet and underneath a layer of said sealing tape; and wire means including a separate pair of wires connected to each thermocouple for transferring data from the separate sites to a data logging device.

14. The testing unit of claim 13 wherein said pins include signal pins and voltage pins.

15. The testing unit of claim 13 wherein each separate pair of wires is fixedly attached on the same surface of said insulator sheet with no overlapping wires and without crossing over any apertures.

16. The testing unit of claim 13 which further includes four thermocouples attached to different predetermined locations on the same surface of said insulator sheet and underneath a layer of said sealing tape.

17. The testing unit of claim 13 wherein said insulator sheet is sized to be mounted over only a portion of said pins on said multichip module.

18. The testing unit of claim 13 wherein said insulator sheet is sized to be mounted over one quadrant of said pins on said multichip module.

19. The testing unit of claim 13 wherein said insulator sheet and said two layers of sealing tape together include at least one border portion having no apertures therein, with at least one thermocouple located on said border portion of said sheet.

20. The testing unit of claim 13 wherein the combined thicknesses of said insulator sheet, said two layers of sealing tape, and one of said thermocouples are sufficiently thin so as to not interfere with the normal operation of the multichip module when placed on the pin side of the module between the module and an adjacent component.

21. The testing unit of claim 13 wherein all of said thermocouples are mounted on the same surface of said insulator sheet.

* * * * *